129,015

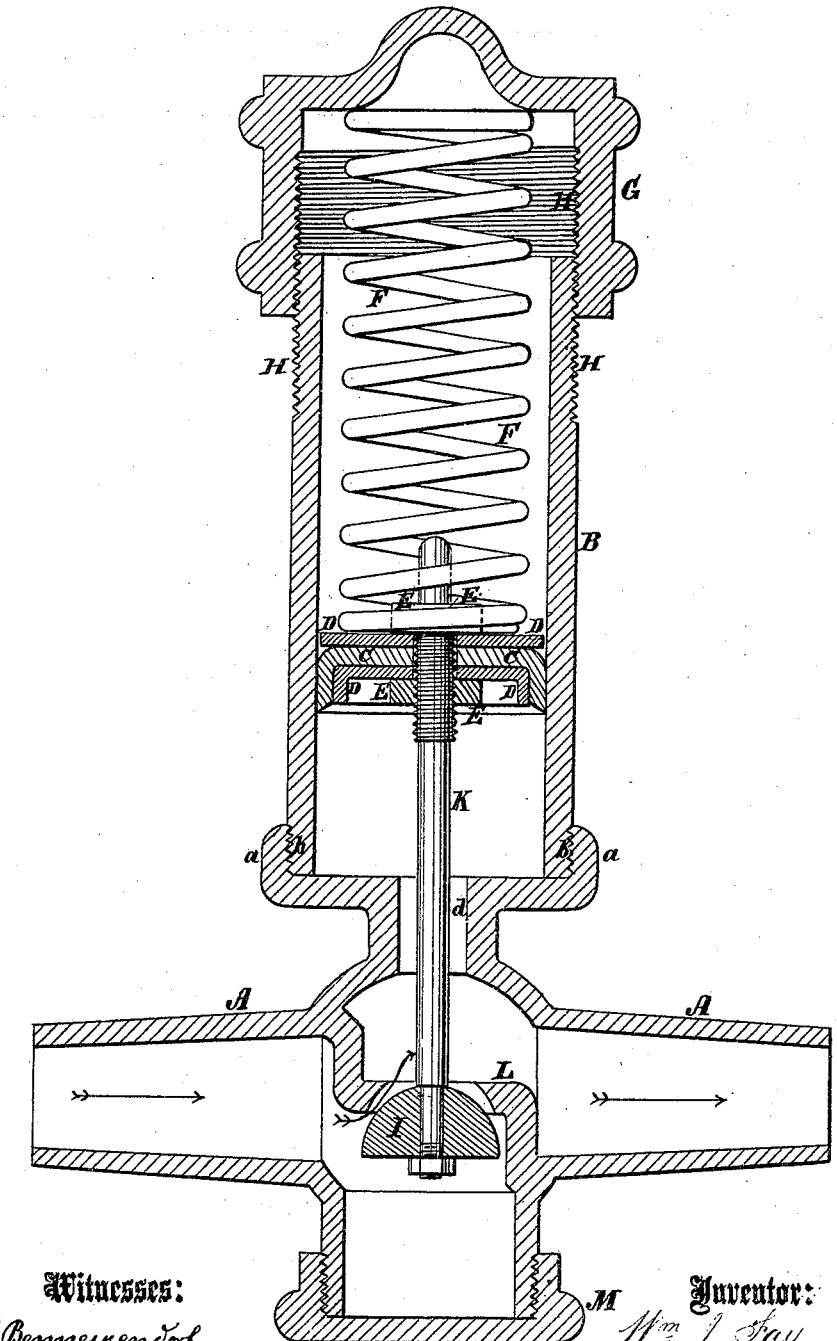

UNITED STATES PATENT OFFICE.

WILLIAM J. FAY AND THOMAS A. CAIRNS, OF DENVER, COLORADO TER.

IMPROVEMENT IN FLUID-PRESSURE REGULATORS.

Specification forming part of Letters Patent No. 129,015, dated July 16, 1872.

Specification describing a New and Improved Fluid-Pressure Regulator, invented by WILLIAM J. FAY and THOMAS A. CAIRNS, of Denver city, in the county of Arapahoe and Territory of Colorado.

Our invention consists of a hollow cylinder attached to a globe or other like valve, and communicating at one end with the chamber or pipe into which the water flows through the valve, and in this cylinder is a piston, whose rod is connected to the valve, and a coiled spring is placed behind the piston under such tension as to hold the valve open until the pressure becomes too great for the pipes beyond the valve, when the water-pressure on the piston will close the valve and keep it closed until the pressure on said piston and in the pipes to be protected falls below the power of the spring, which will then open said valve again.

The drawing represents a sectional elevation of our apparatus for regulating the flow of water, and for shutting off the water at certain pressures, so that the pressure in pipes of houses situated in the low districts may be regulated to a point suitable for the location of the house, or to shut the water off when there is an excess of pressure—as, for instance, in the case of fire, when the Holly Water-Works are in operation, thus preventing the bursting of hot-water apparatus and the weak pipes of the house.

A A is made in the form of the ordinary globe-valve, having soldered or screwed ends, and having a socket, $a$, cast on the upper end to receive the cylinder B, to which it is made fast by a thread at the point $b$ $b$. C is a cupped leather packing, which, expanding with the pressure, prevents leakage into the upper part of the cylinder B. D D are brass cup and plate to keep the leather in form. E E are nuts to hold all on stem. F is a spring, which is compressed to the proper point by means of the cap G, turning on the screw-threads at H. I is a rubber, leather, or metal valve attached to stem K, and filling the water-way in the diaphragm L, when raised, as shown in drawing. M is a cap screwed on to admit the valve I to be screwed on stem K.

The operation of the machine is as follows: The valve being open, water is admitted from the main pipe, as indicated by the arrows. It finds a passage to the under side of the piston-leather C through the opening $d$ for the stem. If the outlets be closed, the pressure, acting on the piston C, will raise it up against the force of the spring F, thereby shutting the water-way with the valve I; then, when an outlet is opened on the pipe in the house, or at any point of the pipe leading from A, the pressure on the lower side of the piston is reduced, so that the spring F is able to force it down and open the valve I, thereby allowing the water to flow at any pressure that may be desired. The cylinder, piston, and spring are proportioned to each other in such a manner as to admit of the nicest adjustment of pressure.

We propose to use a piston in this manner in preference to the diaphragm heretofore used, because it admits of greater motion of the valve, and that the valve is or can be made conical or parabolic in form, thereby closing the opening gradually until it arrives at the entirely-shut point, producing no concussion in the pipes. The diaphragm admits of but little motion of the valve, thereby necessitating the use of a nearly flat valve, which, on closing, produces concussion in the pipes, and a disagreeable noise when the force of the spring and the pressure of the water on the diaphragm are nearly equal.

After repeated trials of the diaphragm in many ways it has been considered practically a failure, particularly when used to regulate the flow of gas. The piston is also superior to the diaphragm, in that it will last for years, while the diaphragm soon wears out.

Having thus described our invention, we claim as new and desire to secure by Letters Patent—

In a pressure-regulator for fluids the combination of a cylinder and piston with the regulating valve and spring, substantially as specified.

WILLIAM J. FAY.
THOMAS A. CAIRNS.

Witnesses:
T. B. McCORMIC,
M. W. LEVY.